United States Patent Office 3,481,771
Patented Dec. 2, 1969

3,481,771
GLASS FIBER COATED WITH STARCH SIZE
COMPOSITIONS
August P. Doering, Martinsville, N.J., assignor to
National Starch and Chemical Corporation, New
York, N.Y., a corporation of Delaware
No Drawing. Filed Apr. 4, 1967, Ser. No. 628,259
Int. Cl. C03c 25/02
U.S. Cl. 117—126                          3 Claims

ABSTRACT OF THE DISCLOSURE

Glass fibers coated with aqueous starch dispersion containing specified starch products which have been washed in deionized water in order to reduce the metallic ion content of the resulting dispersion to a maximum level of about 600 ppm.

---

As is well known to those skilled in the art, glass fibers are ordinarily produced by means of a procedure whereby a glass batch composition, or pre-formed glass marbles or cullet, are first heated to a molten state. The resulting molten mass is thereupon flowed or pulled through tiny orifices or tips in a platinum bushing whereupon the merging filaments, while still at extremely high temperatures, are immediately drawn or attenuated by means of a longitudinal force which is applied through the medium of a driven winder mechanism or the like.

Immediately subsequent to their formation, it is the usual practice to size the glass fibers. Thus, the size is applied to the individual filaments as the fibers are drawn, by the means described hereinabove, in order to strengthen the fibers, preserve the integrity of the strands during winding and unwinding, as well as facilitate their eventual processing.

There are many substances which have been in use as glass fiber forming size materials. Thus, aqueous dispersions of various straches and starch derivatives are often employed for this purpose. However, starch and the heretofore employed starch derivatives have many shortcomings which the practitioner has long sought to overcome. Raw starch dispersions, although they are capable of forming satisfactory films, may, for instance, be rather unstable and tend to break down or thin out as a result of being continuously maintained at the elevated temperatures required for their application to the fibers, thereby decreasing their sizing capabilities. Some starches tend to form gels upon cooling, which in many cases cause a wide variation in viscosity as a result of the temperature fluctuations which are experienced. Such viscosity variations also result in poor sizing performance. Furthermore, the waxy maize variety of starch is known to exhibit "size migration." Thus, in dehydrating the sized fiber, the migration to the surface of the excess water carries with it some of the starch size. This migration of the size results in the deposition of unequal amounts of starch solids on the glass fibers thereby resulting in broken and fuzzy yarns when these fibers are eventually fabricated and textured. The imperfections in the glass strands as well as in the products fabricated therefrom represent a substantial economic handicap to the practitioner in the field.

Problems have also arisen with regard to the use of starch derivatives, such as starch acetates, in the sizing of glass fibers. Thus, these derivatives lack the rapid ashing characteristics which are essential to the proper performance of glass forming sizes. Ashing, or coronization as it is sometimes referred to, is the procedure whereby the fabric, which has been woven from the sized fibers, is heated at temperatures ranging from 1200 to 1400° F. in order to remove the size and thus set the fiber in the fabric. It is essential that the size be removed rapidly and completely without leaving dark spots or gray bands on the surface of the fibers. Failure to ash rapidly and completely results in the formation of imperfect, streaked fabrics wherein all the glass fibers present therein do not exhibit similar appearance or light reflectance characteristics.

Another major difficulty with the glass fiber sizes currently in use is that they impart substantial concentrations of metallic ions to the glass fibers. The presence of these metallic ions, and especially of sodium ions, decreases the efficiency of the spinning operation since the ions react with the hot molten glass thereby causing defects in the yarn as it is drawn away from the spinneret. The resulting yarns are either totally useless or so weakened as to prevent their being woven into complex patterns. Furthermore, the presence of metallic ions in glass fibers is especially undesirable where the fibers are to be utilized in certain applications such, for example, as in the manufacture of printed circuit boards where it is desirable to have the fibers completely devoid of any ability to conduct an electric current. Needless to say, the retention of metallic ions in the glass fibers substantially increases their conductivity. The presence of the ions also adversely affects the ashing rate, thus leading to the non-uniformity and streaking previously described.

It is, thus, the prime object of this invention to provide a forming size composition for glass fibers. It is a further object to provide a forming size composition characterized by its rapid ashing rate, its stability, its limited migration and its low level of metallic ions. Another object is to provide a forming size composition for glass fibers which imbues the fibers with added strength and uniform appearance. Various other objects and advantages of this invention will be apparent from the discussion that follows hereinafter.

In brief, the process of this invention involves the sizing of glass fibers, while they are in the process of being formed, utilizing a forming size composition comprising a selected starch product which has been washed with deionized water so as to reduce the metallic ion content of the resulting size composition to a maximum level of about 600 p.p.m. It is seen, therefore, that this process requires the presence of a combination of two elements, namely, the use of an appropriate starch product and its subsequent washing with deionized water; both of the latter elements thereby serving to contribute towards the preparation of glass forming size compositions which exhibit fast ashing rates, minimal migration, enhanced stability and low concentrations of metallic ions.

The starch products which are applicable for use as forming sizes in the process of this invention may be selected from among the class of starch derivatives, i.e. starch esters and ethers, of inhibited, i.e. crosslinked, starches as well as of starches exhibiting both inhibition and derivatization. Among the applicable starch esters are included acetates, propionates, butyrates, laurates, stearates and oleates, while hydroxyethyl, hydroxypropyl, methyl, ethyl, and propyl ethers are illustrative of applicable starch ethers. Methods for the preparation of the various starch derivatives are well known to those skilled in the art.

In our use of the term "inhibited starch," we refer to a starch in which the disintegration of its granules is retarded under conditions whereby the intact granules would ordinarily swell and burst. In order to inhibit a starch base, it is ordinarily necessary to react the starch with a crosslinking agent. These include: aliphatic dihalides such as propylene dichloride, dichloropentane, ethylene dibromide, glycerol dichlorohydrin and dichlorobutane; ether forming epoxy halogen compounds such as epichlorohydrin, and epibromohydrin; certain polyfunctional reagents such as cyanuric chloride, phosphorus oxychloride, metaphosphates and polymetaphosphates; aldehydes such as formaldehyde, acrolein and formaldehyde containing resins and prepolymers; succinic anhydride; and, mixtures of adipic or citric acid with acetic anhydride. In general, these crosslinking agents may be defined as compounds containing at least two functional groups which can react with at least two available hydroxy groups of the starch molecule or molecules and thus alter the cooking characteristics of the resulting starch product.

With respect to the actual preparation of these inhibited starches, we refer to a number of U.S. patents relating to various inhibiting processes. These include: U.S. 2,500,950, which covers the use of dihalides and epoxy halogen compounds; U.S. 2,805,220, which covers the use of cyanuric chloride; U.S. 2,801,242, which covers the use of mixtures of meta and polymetaphosphates; U.S. 2,461,139, which covers the use of mixtures of adipic or citric acid with acetic anhydride; and U.S. 2,328,537, which covers the use of phosphorus oxychloride.

The selected starch product may be derived from raw starch bases obtained from such plant sources as corn, potato, sweet potato, wheat, rice, sago, tapioca, sorghum, high amylose corn or the like, and preferably corn starch. In addition, the amylose and amylopectin fractions derived from any of the above noted starch bases may also be utilized.

The starch products which are to be utilized in preparing the sizing compositions of this invention must possess certain inherent characteristics so that the resulting sizing compositions will, in turn, exhibit the following essential properties: (1) maximum stability at the solids concentrations and temperatures utilized in their application to the glass fibers; (2) increased viscosity and the formation of a gel structure at the lowered temperatures encountered subsequent to their application to the glass fibers; and, (3) a low concentration of metallic ions which thereby enables the thus deposited sizing composition to ash in a rapid and efficient manner.

The substituent groups and/or the crosslinkages of the applicable starch products serve to impart the desired stability to the sizing compositions derived therefrom. Thus, these sizing compositions maintain their consistency for prolonged periods prior to their application to the glass fibers during which time they are subjected to elevated temperatures in excess of about 115–140° F. In resisting breakdown or thinning, these sizing compositions greatly enhance their sizing efficiency. Furthermore, these sizing compositions are stable in dispersions containing concentration levels of about 1–5%, by weight, of starch product, such levels being ordinarily used for glass fiber sizing operations.

The dispersed starch products must also retrograde, i.e. they must show a sharp increase in viscosity, so as to form a gel structure, with or without the presence of cationic lubricants, when the temperature of the sizing composition is reduced to about 100–130° F. The latter temperature range is encountered when the starch size is physically present on the glass fiber and it is desirous to form the gel structure in order to firmly adhere the size to the fiber as well as to prevent its migration. The temperature at which the starch product will produce a gel structure is referred to as its "gel temperature."

The method for determining the gel temperature of a starch product involves dispersing 26.4 grams of starch (anhydrous basis) in enough distilled water to give a total weight of 800 grams. The resulting dispersion is then cooked for a period of 30 minutes whereupon 3.3 grams of a cationic softener are thoroughly blended therewith. The dispersion is then allowed to cool to room temperature during which time the viscosity of the dispersion is continuously monitored by means of a Brookfield RVF viscometer utilizing a #1 spindle at 20 r.p.m. The temperature at which a viscometer reading of 100 is indicated for the dispersion is cited as the "gel temperature" of the starch product.

As previously mentioned, the desirable stability and viscosity properties of these starch products is determined by the level of substitution or the extent of crosslinking present therein. Typical values for the preferred level of substitution in the starch derivatives, i.e. the starch esters and ethers, applicable for use in this process range from about 0.5–5% of substituent groups, and preferably from about 0.5–2.5%, as based on the dry weight of the starch derivative.

With respect to amount of crosslinking required, this is determined by the granule swelling power (GSP) of the resulting crosslinked starch. Granule swelling power is a measure of the extent of granule inhibition, and may be defined as the amount of swollen, hydrated paste which is formed by the cooking, in water under specific conditions, of one gram of dry starch as divided by the weight of anhydrous starch in the swollen paste. Thus, in order to function effectively as glass fiber sizes, the inhibited starch products applicable for use in the process of this invention should have a GSP value in the range of from about 20 to 40.

The GSP is determined, in practice, by dispersing one gram of starch (anhydrous weight) in enough distilled water to give a total weight of 100 grams. Normally, the starch is suspended in this water, stirred over a boiling water bath for five minutes and then covered for the remainder of the cooking cycle. After cooking is complete, the sample is readjusted to a weight of 100 grams and transferred, quantitatively, into graduated 100 ml. centrifuge cups. The sample is then centrifuged at 2000 r.p.m. for exactly 20 minutes and the starch dispersion is removed as a clear supernate and a compacted swollen paste. The wet weight of the swollen paste is determined directly after the decantation of the supernate and the amount of dry solids in the supernate is determined by evaporation. The granule swelling power is then calculated by the formula:

$$GSP = \frac{\text{Wet weight of swollen paste} \times 100}{(\text{Weight of dry starch})(100\% \text{ of insolubles})}$$

The use of a starch product which has been substituted or crosslinked to a degree which is substantially less than hereinbefore specified will, because of its excessively high gel temperature, prevent the appearance of the desired stability at the requisite temperatures and concentrations of the sizing process.

On the other hand, the use of a starch product which has been substituted or crosslinked to a degree which substantially exceeds the above cited values prevents the desired viscosity increase at reduced temperatures and also decreases the gel temperature beyond the acceptable range so as to increase the extent to which the size will migrate.

As noted earlier, in addition to selecting a starch product capable of providing the above described stability, gel temperature and viscosity characteristics, the starch products utilized in these novel forming sizes must also contain less than about 600 p.p.m. of metallic ions. Thus, typical starch sizes will usually containg in excess of 1000 p.p.m. of metallic ions, the latter high concentration resulting primarily from the use, in their preparation and washing, of water which has a high concentration of sodium and calcium ions. Therefore, although such sizing compositions exhibit gel temperatures within the desired range, their high concentration of metallic ions renders them unsuitable for use as glass fiber sizes inasmuch as the presence of the metallic ions results in poor spinning stability, increased ashing rates, decreased ashing efficiency, increased electrical conductivity and an increased number of imperfections in the resulting glass fibers.

In order to overcome the above described disadvantages, the starch products applicable for use in the forming size compositions of this invention must be washed, prior to use, in deionized water so that they will contain no more than about 600 p.p.m. of metallic ions. Thus, in contrast to conventional washing techniques wherein the filter cake resulting from the starch preparation is reslurried several times in regular tap water, the starch sizes of this invention are washed with deionized water in order to minimize the level of undesirable metallic ions, and primarily sodium and calcium ions.

The preparation of deionized water is well known to those skilled in the art. Thus, for example, tap water may be passed through a series of ion exchange resins, one of which removes cations and the other anions, in order to prepare water which will contain a maximum of about 5 p.p.m. of ionizable solids.

In summary, therefore, it is seen that the starch products which are applicable for use in the sizing process of this invention must, firstly contain a controlled amount of substitution and/or crosslinking in order to provide the sizing compositions prepared therefrom with the requisite stability and a gel temperature ranging from about 100–130° F. and they must, secondly, have a concentration of metallic ions which does not exceed about 600 p.p.m.

In utilizing the starch sizes of this invention, aqueous dispersions usually containing from about 1 to 5%, by weight, of the desired starch product are prepared and cooked, under agitation, at temperatures of from about 180 to 250° F. for a period of about 5 to 30 minutes. Needless to say, deionized water is used in preparing the latter aqueous dispersions in order to maintain the concentration of metallic ions therein below the desired 600 p.p.m. level. The resulting cooked sizing compositions are then maintained at temperatures ranging from about 120–140° F. prior to their being applied to the glass fibers.

If desired by the practitioner, various lubricants, such as those based on fatty acids and their reaction products; coupling agents, such as those based on silanes and their derivatives; and, emulsifiers, such as ethylene glycol esters, polyethylene glycol esters, alkyl aryl polyoxyethylene alcohols, polyalkylene amines, polyoxyethylene esters, amine condensates and the like may be included as optional ingredients in the forming sizes of this invention.

The sizing compositions of this invention are well suited for application to glass fibers by means of any of the various methods known to the practitioner. In a typical procedure, streams of molten glass issuing from a number of apertures arranged in the bottom of a glass melting furnace are drawn out into very fine filaments by a rapidly rotating cylinder or drum upon which the filaments are wound in the form of strands comprising groups of filaments.

Thus, the forming size compositions of this invention are, preferably, applied to the fibers immediately subsequent to their formation by attenuation but prior to their being wound, as strands, upon a rotating drum by means of any conventional method of contact, immersion or spray application such as the apron applicators disclosed by U.S. Patent No. 2,873,718; pad applicators as disclosed by U.S. 2,390,370 and 2,744,563; transfer rolls such as those disclosed by U.S. 2,693,429 and 2,742,737; or, a spray such as those noted in U.S. 2,491,889 and 2,846,348. The concentration of the forming size composition which may be applied to the glass fibers will ordinarily be in the range of about 1 to 6% of starch solids, as based on the weight of the fibers. This small quantity of starch solids is nonetheless sufficient to adhere the individual filaments together within an integral strand which thus protects the filaments from abrading one another and also serves to maintain the integrity of the strand when it is unwound for subsequent processing.

The following examples will further illustrate the embodiment of this invention.

EXAMPLE I

This example illustrates the superior glass fibers sizing properties exhibited by the starch sizing compositions of this invention.

The composition of the various starch products used in the preparation of the sizing compositions of this example is given in the following table. Each of these starch products had been washed five times with deionized water containing no more than about 5 p.p.m. of metallic ions by means of a procedure whereby the initial starch product reaction mixture was first filtered so as to yield a filter cake which was then slurried in the deionized water and re-filtered. The actual sizing compositions were then prepared by heating deionized water dispersions containing 3.3%, by weight, of the respective starch products at a temperature of 200° F. for a period of 30 minutes.

In testing the starch products and the resulting size compositions, the following procedures were utilized with the results of these tests also appearing in the following table.

*Gel temperature.*—As described hereinabove.

*Size migration.*—In this procedure, glass yarn, which had been sized with dispersions of the respective starch products, was wound on a cardboard spool to a thickness of approximately one inch and then dried at a temperature of about 250° F. Thereafter, one gram samples of yarn were removed from the strands closest to the core of the spool as well as from the strands at the outer surface of the wound spool. These samples were subjected to a temperature of 1300° F. for a period of 10 minutes whereupon the resulting yarn was weighed to determine the amount of size which had been burned off. The weight ratio of size on the outer strands to that present on the inner strands is determinative of resistance to size migration and is rated according to the following standards:

Weight ratio of:
    1.00–1.05 _____ Excellent.
    1.05–1.10 _____ Very good.
    1.10–1.15 _____ Good.
    1.15–1.30 _____ Fair.
    1.30–1.50 _____ Poor.

*Rate of ashing.*—In this procedure, 0.46 gram of the particular anhydrous starch product being evaluated was placed in a crucible and then subjected to an oven heat of 1300° F. The time required for the black ash, which initially resulted from the charring process, to be eliminated by continued heating is referred to as the "rate of ashing."

*Workability.*—This characteristic was determined as part of the "gel temperature" determination described hereinabove. Thus, excellent workability was indicated if the viscosity of the aqueous starch dispersion at a temperature of 160° F. was substantially maintained despite the decrease in temperature to 135–140° F. An increase in viscosity, during this cooling period, which exceeded about 100% was indicative of poor workability since it is desirable that the starch size should substantially retain its fluidity until it reaches its gel temperature.

| Type | Properties of Starch Product | | Properties of the Sizing Composition | | |
|---|---|---|---|---|---|
| | P.p.m. of Na ions | Gel Temp. (° F.) | Migration | Workability | Rate of Ashing (min.) |
| Acetylated corn starch containing 1.1%, by wt., of acetyl groups. | 250 | 130 | Excellent | Good | 5.5 |
| Acetylated corn starch containing 2%, by wt., of acetyl roups. | 200 | 118 | Very good | Very good | 5.0 |
| Acetylated corn starch containing 3%, by wt., of acetyl groups. | 300 | 112 | Good | Excellent | 5.5 |
| The hydroxypropyl ether of corn starch containing 1.1%, by weight, of hydroxypropyl groups. | 200 | 115 | do | Very good | 5.0 |
| A corn starch which had been inhibited to a GSP value of 28 by treatment with 0.005%, by weight, of epichlorohydrin according to the procedure set forth in Ex. II of U.S. Patent No. 2,500,950. | 150 | 122 | Very good | do | 4.0 |
| A corn starch which had been inhibited to a GSP value of 25 by treatment with 0.01%, by weight, of epichlorohydrin according to the procedure set forth in Ex. II of U.S. Patent No. 2,500,950. | 250 | 123 | do | do | 5.0 |
| A corn starch which had been inhibited to a GSP value of 33 by treatment with 0.01%, by weight, of phosphorus oxychloride according to the procedure set forth in U.S. Patent No. 2,328,537. | 215 | 124 | do | do | 5.0 |

The above described results clearly indicate the excellent sizing properties which characterize the novel forming size compositions of this invention.

EXAMPLE II

This example illustrates the necessity of preparing sizing compositions using only those starch products having the required characteristics set forth herein. Thus, a comparison will be offered with sizing compositions containing starch products which, for example, were not derivatized or inhibited, which did not possess the required gel temperature and/or which were not washed with deionized water so as to reduce their concentration of metallic ions within the stated limits.

The procedures described in Example I, hereinabove, were used in the preparation, washing and testing of the various starch products and resulting sizing compositions utilized in this example. A description of these starch products and sizing compositions and their performance data is presented in the following table. Unless otherwise indicated, these starch products were washed with deionized water.

The above described results clearly indicate the superior seizing properties exhibited by the novel sizing compositions of this invention as compared with the properties exhibited by sizing compositions containing starch products which did not conform to the standards specified for the starch products applicable for use in the process of this invention.

Summarizing, this invention is seen to provide for the preparation and use of novel glass fiber forming size compositions which exhibit excellent stability, viscosity and ashing properties and which impart strength, durability and uniformity to the resulting sized glass fibers.

Variations may be made in proportions, procedures and materials without departing from the scope of this invention which is defined by the following claims.

I claim:

1. A glass fiber having deposited thereon the dried residue of a sizing composition comprising a dispersion, in deionized water, of a starch product selected from the group consisting of starch esters, starch ethers, inhibited starches, inhibited starch esters and inhibited starch ethers, the latter inhibited starch products having a granule swelling power, as herein defined, in the range of from about 20 to 40; said dispersion having a metallic ion concentration which does not exceed a value of about 600 p.p.m.

2. The glass fiber of claim 1, wherein said starch esters, starch ethers, inhibited starch esters and inhibited starch ethers contain from about 0.5 to 5.0% of substituent groups, as based on the dry weight of the starch product.

3. The glass fiber of claim 1, wherein said starch prod-

| Type | Properties of Starch Product | | Properties of the Sizing Composition | | |
|---|---|---|---|---|---|
| | P.p.m. of Na ions | Gel Temp. (° F.) | Migration | Workability | Rate of Ashing (min.) |
| Acetylated corn starch containing 2.5%, by wt., of acetyl groups. | 250 | 112 | Good | Excellent | 5 |
| A corn starch which had been inhibited to a GSP value of 25 by treatment with 0.01%, by weight, of epichlorohydrin according to the procedure set forth in Ex. II of U.S. Patent No. 2,500,950. | 250 | 123 | Very good | Very good | 5 |
| Corn starch | 300 | 132–136 | Excellent | Poor | 6 |
| An acetylated corn starch containing 2%, by wt., of acetyl groups which had been washed with tap water. | >1,000 | 117 | Very good | Very good | >7 |
| A corn starch which had been inhibited to a GSP value of 17 by treatment with 0.03%, by weight, of epichlorohydrin according to the procedure set forth in U.S. Patent No. 2,500,950. | | <100 | Poor | Excellent | | uct has a gel temperature, as herein defined, in the range of from about 100 to 130° F.

References Cited

UNITED STATES PATENTS

| | | | |
|---|---|---|---|
| 2,523,709 | 9/1950 | Moe | 260—233.3 |
| 2,892,737 | 6/1959 | Rohwer | 127—40 |
| 3,251,748 | 5/1966 | High et al. | 260—233.3 X |
| 2,543,281 | 2/1951 | Ferrin | 127—69 |

JULIUS FROME, Primary Examiner

T. MORRIS, Assistant Examiner

U.S. Cl. X.R.

161—175; 106—210